(12) United States Patent
Lai

(10) Patent No.: US 7,396,243 B1
(45) Date of Patent: Jul. 8, 2008

(54) CARD CONNECTOR FOR AUTOMOBILE

(75) Inventor: Yaw-Huey Lai, Taipei County (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 11/798,663

(22) Filed: May 16, 2007

(30) Foreign Application Priority Data

Mar. 19, 2007 (TW) ............... 96109415 A

(51) Int. Cl.
*H01R 13/62* (2006.01)
(52) U.S. Cl. .................................... 439/159
(58) Field of Classification Search ............... 439/159, 439/160, 161–162, 142
See application file for complete search history.

(56) References Cited

U.S. PATENT DOCUMENTS

| | | | | |
|---|---|---|---|---|
| 4,931,622 A | * | 6/1990 | Ohtsuki et al. | 235/487 |
| 7,303,413 B1 | * | 12/2007 | Lai et al. | 439/152 |
| 7,351,081 B1 | * | 4/2008 | Lai | 439/159 |
| 2003/0022541 A1 | * | 1/2003 | Shimada et al. | 439/159 |

FOREIGN PATENT DOCUMENTS

| | | |
|---|---|---|
| CN | 200420047939.5 | 3/2005 |
| CN | 200520105617.6 | 10/2006 |
| TW | I 264160 | 10/2006 |

* cited by examiner

*Primary Examiner*—Michael Zarroli
*Assistant Examiner*—Phuong Nguyen
(74) *Attorney, Agent, or Firm*—Bacon & Thomas, PLLC.

(57) ABSTRACT

A card connector for automobile includes a main member, three sliding blocks, a first elastic device, a first elastic device, and three terminal sets. The main member includes a space therein, an opening at a front thereof, a hollow portion communicated with the space and the opening, a stop device, an elastic piece and a releasing device on the elastic piece. The sliding blocks are received in the space of the main member and reciprocated along a card path. The first elastic device, which is provided in the main member, urges the first sliding block outwards. The terminal sets are provided in the main member and corresponds to the sliding block. The present invention has a powerful shockproof function, an easy way to eject card and dustproof function.

8 Claims, 11 Drawing Sheets

CARD CONNECTOR FOR AUTOMOBILE

BACKGROUND OF THE INVENTION

1. Field of the Invention

The present invention relates generally to an electronic card connector, and more particularly to a card connector for automobile.

2. Description of the Related Art

A card connector on automobile is designated for an audio/video equipment of the automobile to be an interface between a memory card and stereo that the stereo on automobile may play the audio/video media in the memory card.

A conventional card connector, such as China patent Publication no. CN200420047939.5, which has a cassette slot with card positioning structure, has the slot with a top side gradually higher from an inner end to an outer end and a stop piece on a bottom side of the outer end of the slot that a card may be inserted into the slot from an opening above the stop piece, and turns to horizontal when cross the stop piece. The card is stopped by the stop piece for restriction in the slot. This kind of storage card connector is shockproof.

Another China patent, Publication no. CN200520105617.6, disclosed a conventional electronic card connector, which includes an insulating base, a plurality of terminals fixed on the insulating base, a dustproof device, an elastic member and a mask device covering the insulating base. This card connector provides the dustproof device for dustproof.

In conclusion, the prior arts provide shockproof and dustproof functions in a common point of view to increase the electrical connection. However, these conventional connectors are not specially designed for automobile that could not fit the vibrating and dusty environment in the automobile.

Taiwan Patent no. 1264160 provides a card connector with protection function, which provides three sliding frames for three different cards. The interaction of above elements may protect terminals.

SUMMARY OF THE INVENTION

The primary objective of the present invention is to provide a card connector for automobile, which provides a well shockproof function.

According to the objective of the present invention, a card connector for automobile includes a main member, at least a sliding block, a first elastic device, a first elastic device, and at least a terminal set. The main member includes a space therein, an opening at a front thereof to be an entrance of the space, a hollow portion on a top thereof communicated with the space and the opening, a stop device above the opening and at a side of the hollow portion, an elastic piece above the opening and a releasing device on the elastic piece and corresponding to the hollow portion. The sliding block, which is received in the space of the main member and reciprocated along a card path, has an acting point to act on a card inserted into the main member. The first elastic device, which is provided in the main member, urges the sliding block outwards. The terminal set is provided in the main member and corresponds to the sliding block. The present invention has a powerful shockproof function, an easy way to eject card and dustproof function.

DETAILED DESCRIPTION OF THE INVENTION

Figure 1:
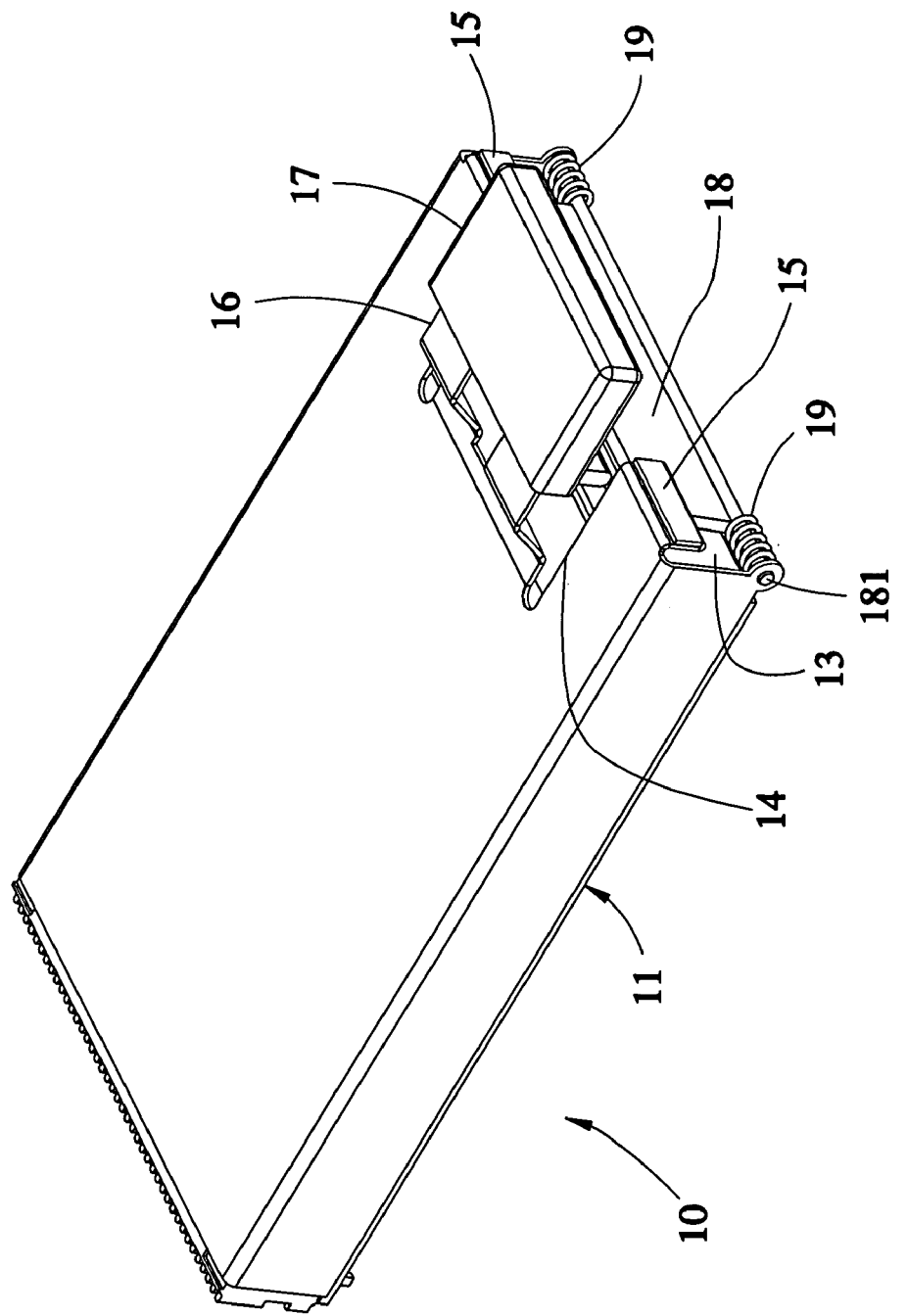
FIG. 1 is a perspective view of a preferred embodiment of the present invention.
Figure 2:
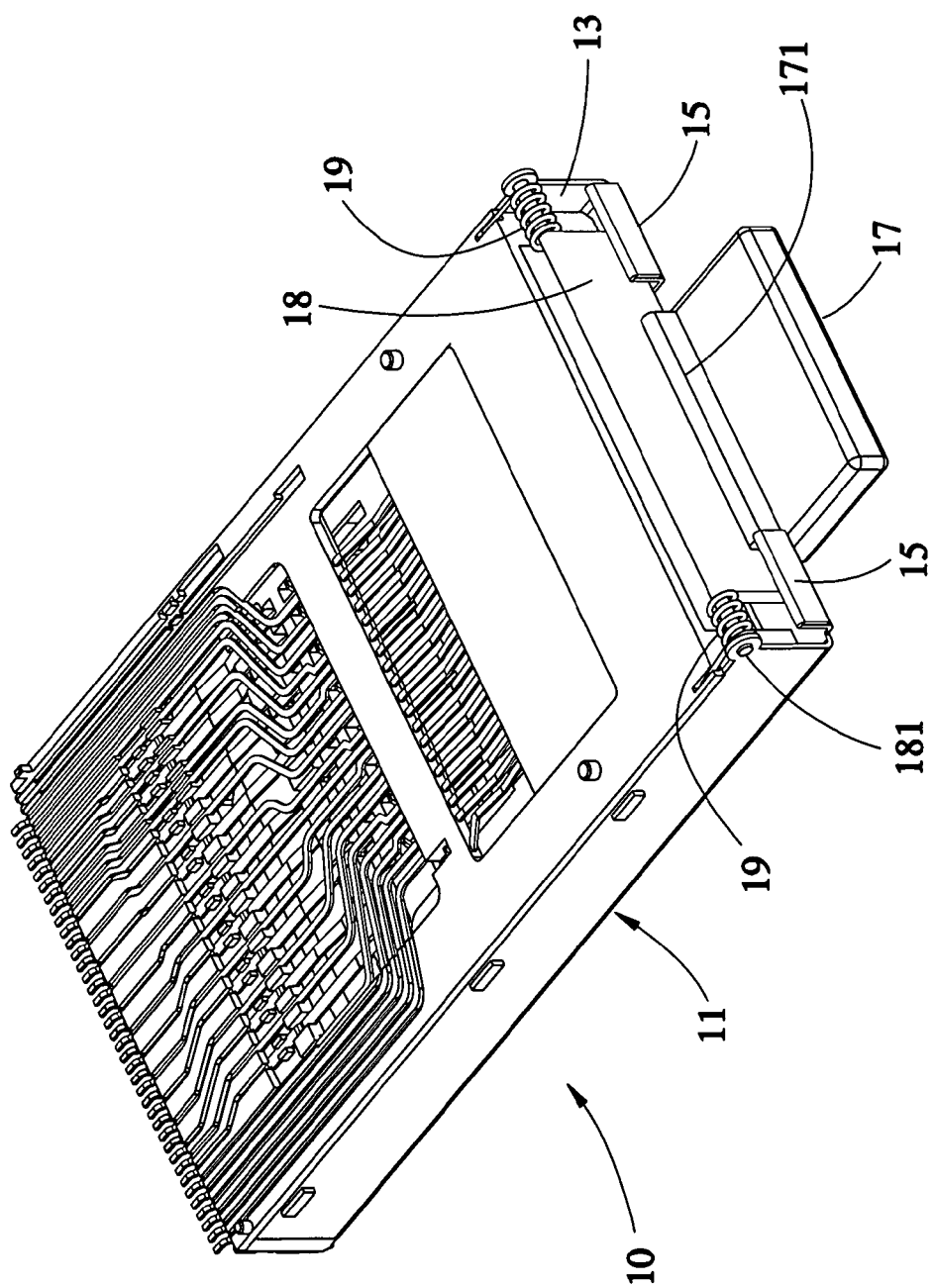
FIG. 2 is a perspective view of the bottom side of the preferred embodiment of the present invention.
Figure 3:
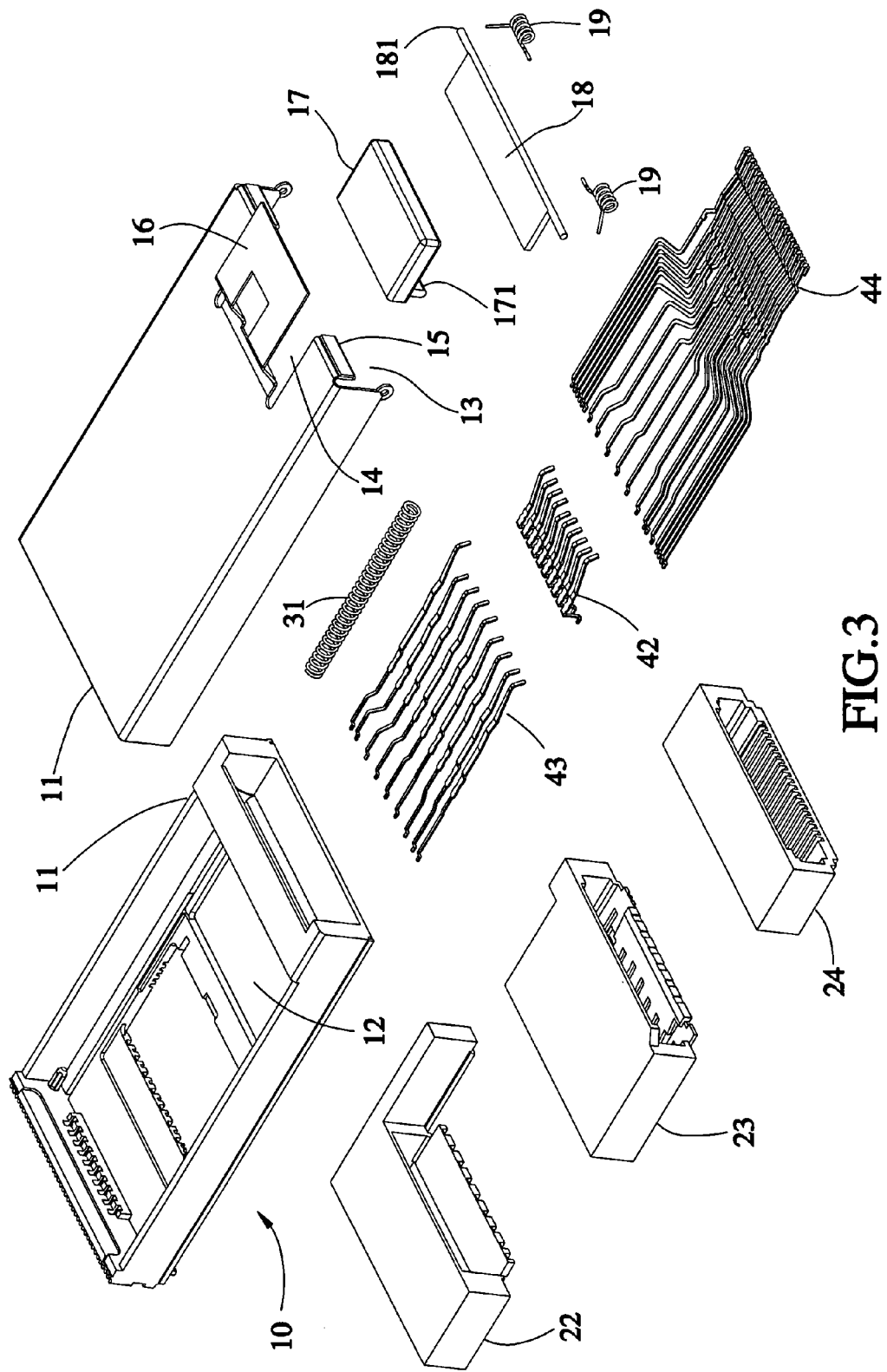
FIG. 3 is an exploded view of the preferred embodiment of the present invention.
Figure 4:
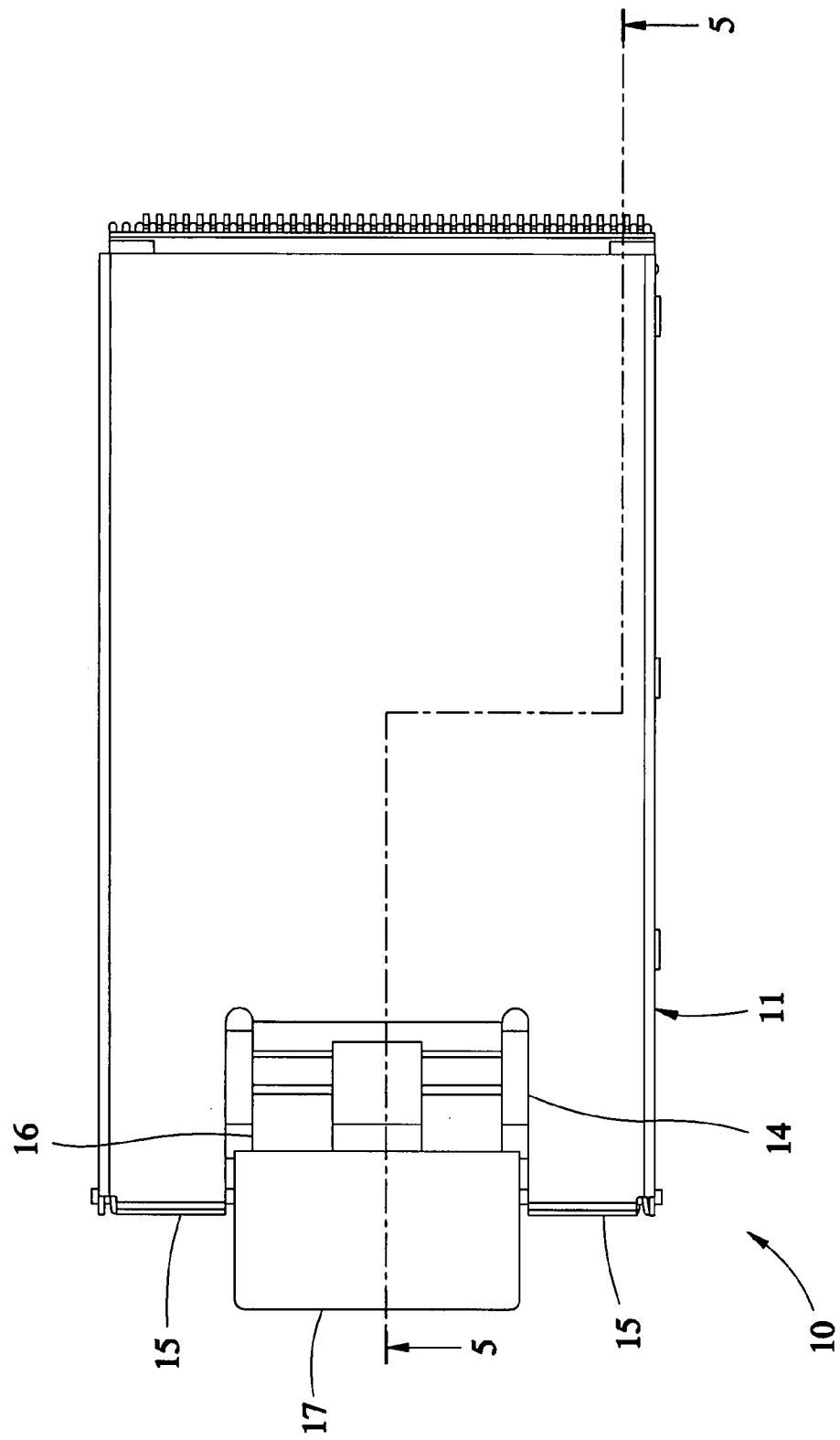
FIG. 4 is a top view of the preferred embodiment of the present invention.

As shown in FIG. 1 to FIG. 5, a card connector 10 for automobile of the preferred embodiment of the present invention includes a main member 11, three sliding blocks 22, 23, 24, a first elastic member 31 and three terminal sets 42, 43, 44.

The main member 11 has a space 12 therein, an opening 13 at a front thereof to be an entrance of the space 12, and a hollow portion 14 on a top thereof to be communicated with the space 12 and the opening 13. The main member 11 has two stop devices 15 above the opening 13 and at opposite sides of the hollow portion 14, an elastic piece 16 above the opening 13 and a releasing device 17 on the elastic piece 16 and corresponding to the hollow portion 14. The releasing device 17, which is connected to the elastic piece 16, has a pressing block 171 projecting downwardly and above the hollow portion 14. The main member 11 includes an elevating device 18, which is a plate having a shaft 181 pivoted on the main member 11 below the hollow portion 14 and the opening 13. The elevating device 18 may swing that an distal end thereof moves up and down relative to the main member 11. The main member 11 has two second elastic members 19, which are two torsional springs in the present embodiment, are fitted to opposite ends of the shaft 181 to urge the main member 11 and the elevating device 18 respectively that makes the elevating device 18 swinging from an inner and lower position to an outer and higher position and kept in a raising position to touch the stop device 15 and close the opening 13.

The sliding blocks 22, 23, 24 are received in the space 12 for reciprocation along a card path. The first sliding block 22 is the one distal to the opening 13, and the third sliding block 24 is the one proximal to the opening 13, and the second sliding block 23 is the one therebetween. The sliding blocks 22, 23, 24, which are interacted with each other, are designated for different cards (not shown).

The first elastic member 31, which is a spring in the present embodiment, is provided in the main member 11 to urge the first sliding block 22 outwardly.

The terminal sets 42, 43, 44, which are received in the space 12 in a series of the first terminal set 42, the second 43 terminal set, and the third terminal set 44 from the inner side of the space 12 to the opening 13. The terminal sets 42, 43, 44 correspond to the sliding blocks 22, 23, 24 respectively.

In fact, each of the terminal sets 42, 43, 44 only has one acting point (not shown) respectively to act on the cards (not shown) inserted into the main member 11. One may find the detail in Taiwan patent no. 1264160 and that is not our main character so we'll not describe it here.

Figure 5:
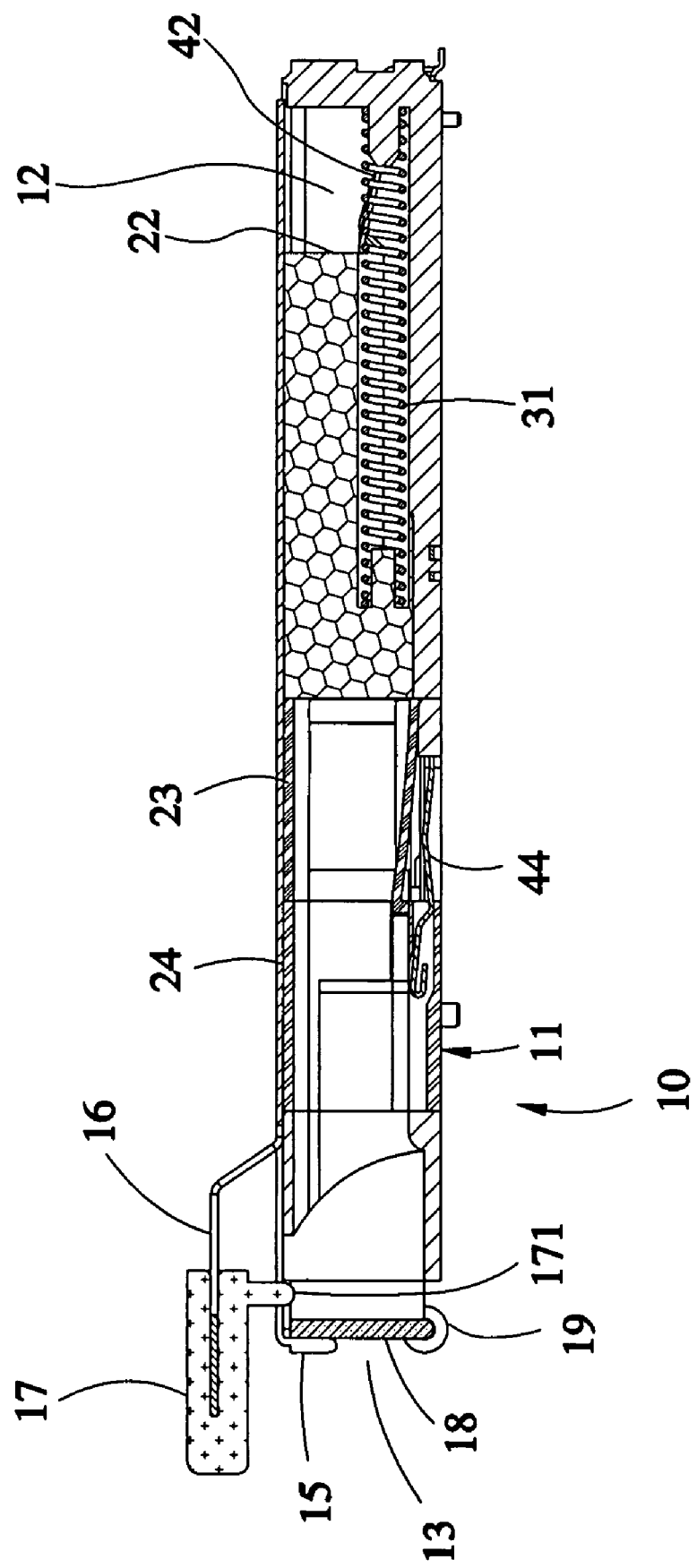
FIG. 5 is a sectional view along the 5-5 line of FIG. 4.

FIG. 5 shows the card connector of the present invention before the card (not shown) is inserted.

Figure 6:
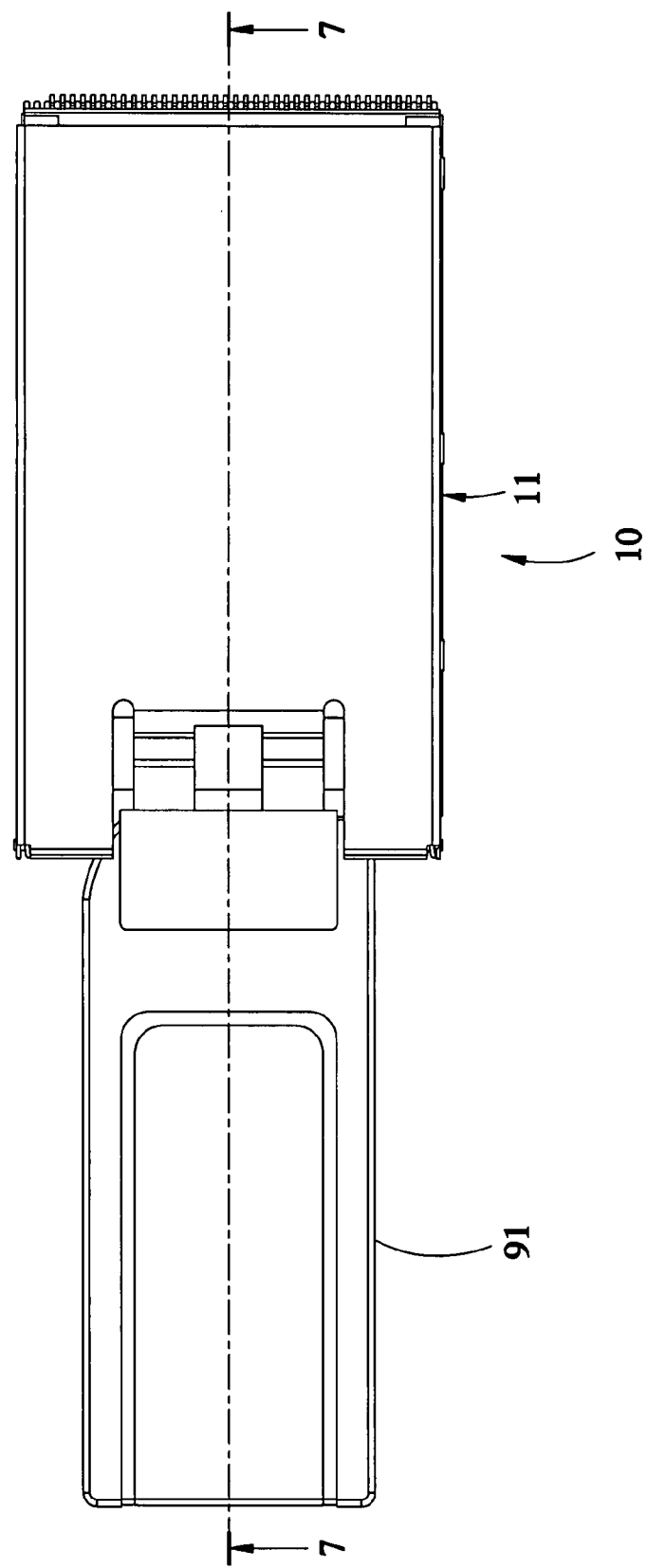
FIG. 6 is a top view of the preferred embodiment of the present invention, showing the card just inserted.
Figure 7:
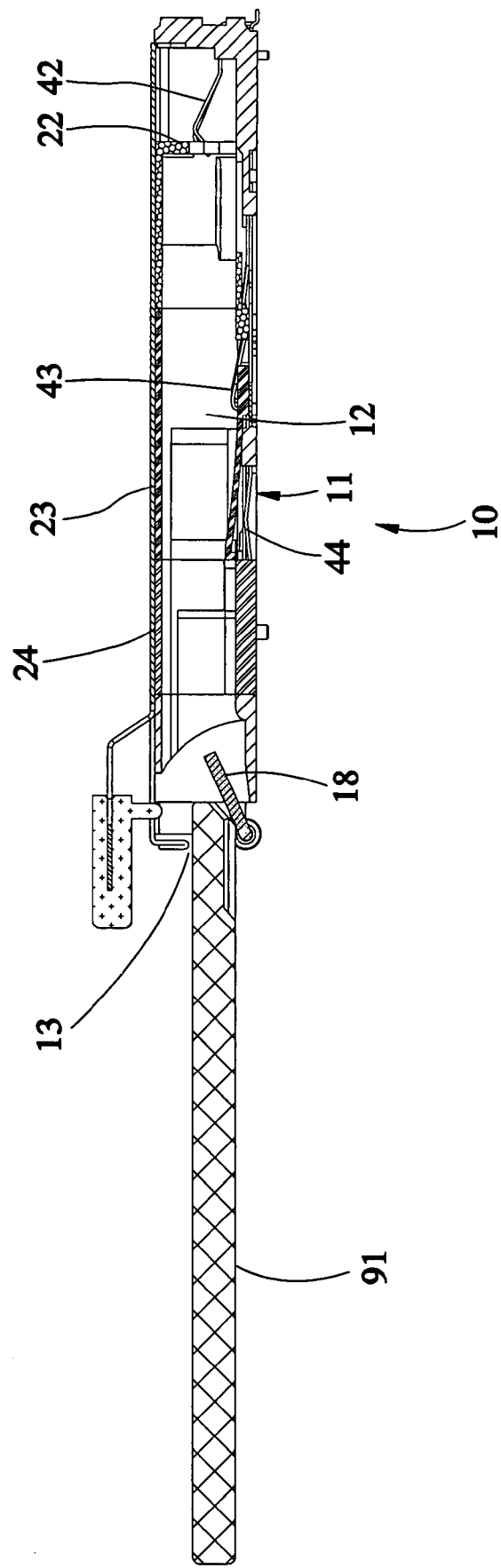
FIG. 7 is a sectional view along the 7-7 line of FIG. 6.
Figure 8:
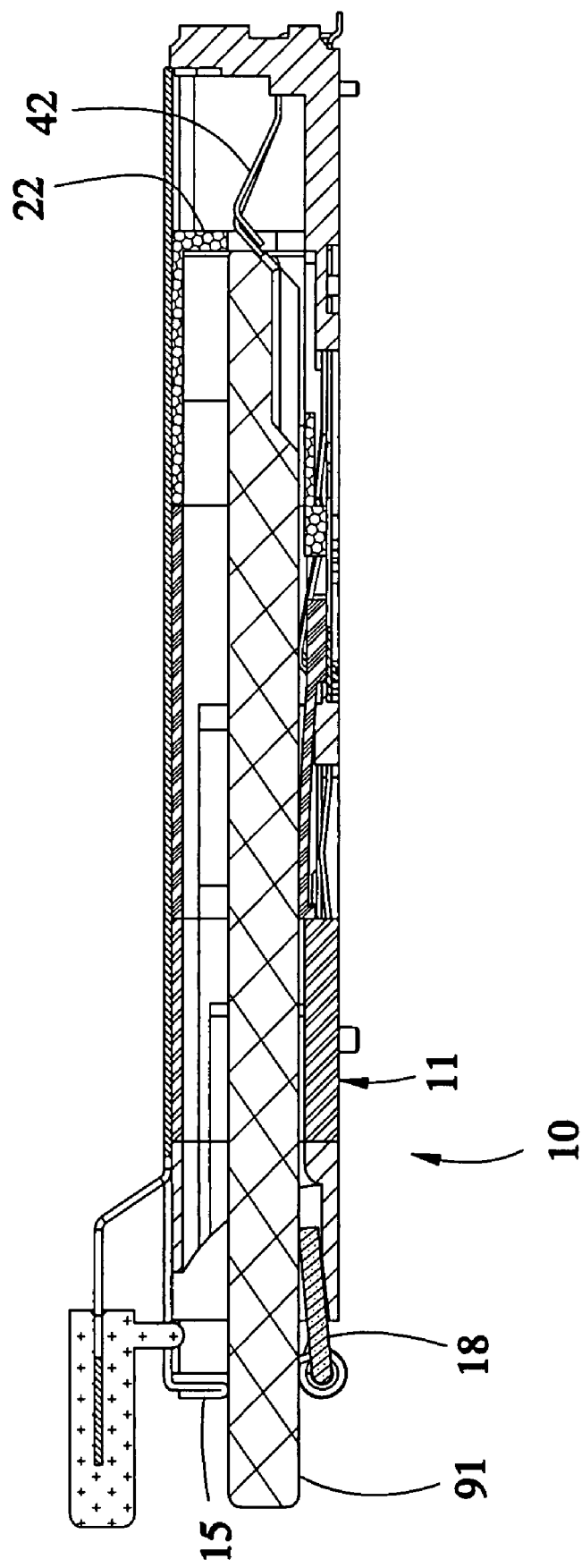
FIG. 8 is a sketch diagram of the preferred embodiment of the present invention, showing the card having the greater part inserted.

As shown in FIG. 6 and FIG. 7, when a card 91, which is a MS card for example, is just inserted, a front end of the card 91 enters the opening 13 and moves away the elevating device 18 that the elevating device 18 swings backwardly and downwardly. As shown in FIG. 8, when the card 91 keeps entering, it will be stopped by the first sliding block 22. In this time, a rear end of the card 91 does not enter the opening 13 yet and the card 91 is pressed by the stopped devices 15.

Figure 9:
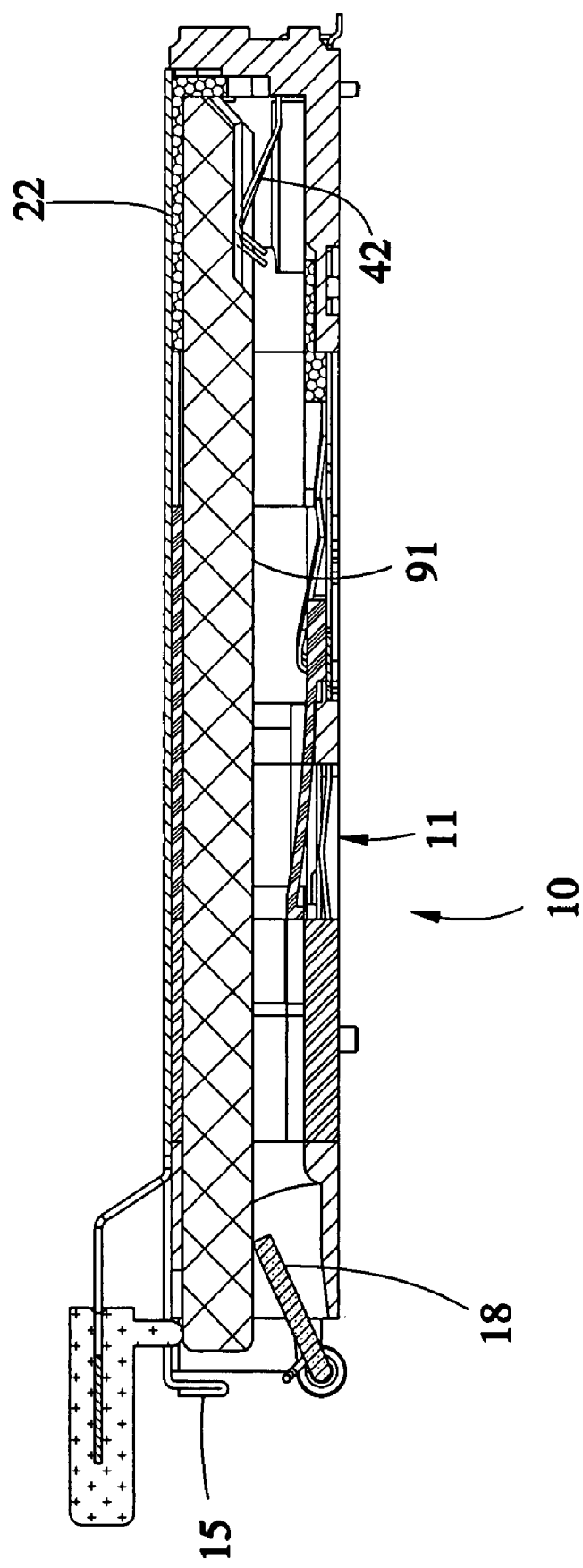
FIG. 9 is a sketch diagram of the preferred embodiment of the present invention, showing the card inserted to the deepest position.

As shown in FIG. 9, when the card 91 is inserted to the deepest position, the first sliding block 91 is moved by the card 91 to an deepest position, and the rear end of the card 91 enters the main member 11 and is elevated by the elevating device 18, and the first terminal set 42 acts on the front end of the card 91.

Figure 10:
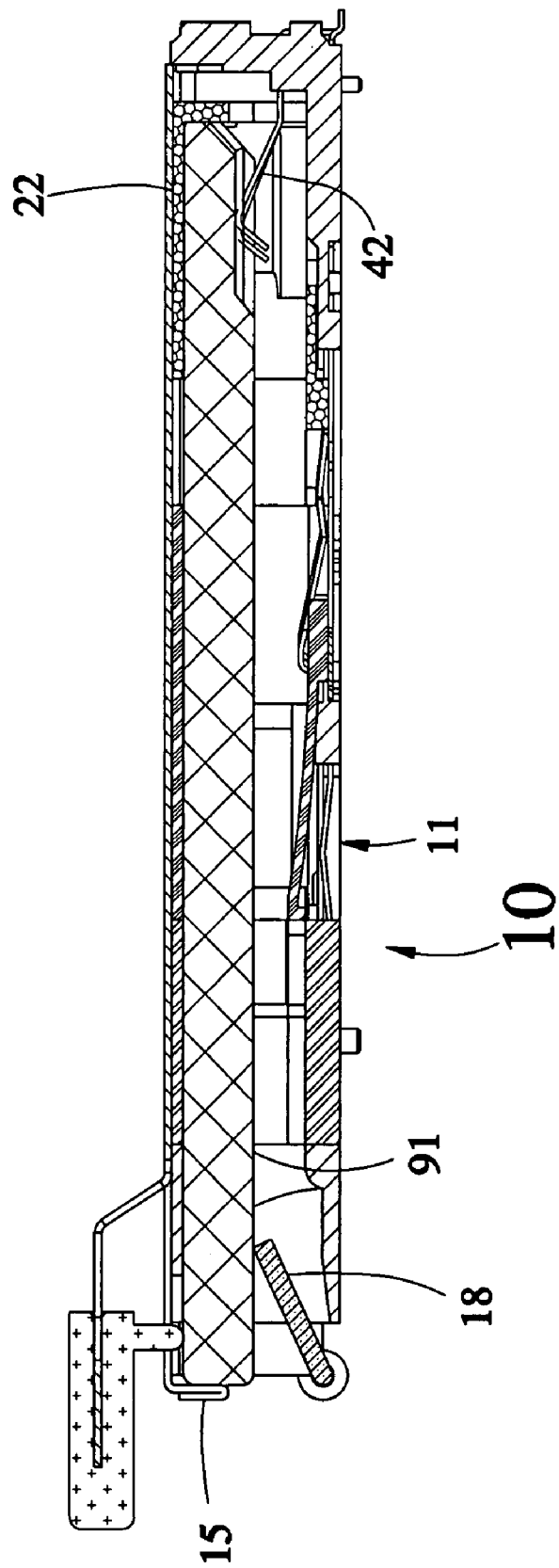
FIG. 10 is a sketch diagram of the preferred embodiment of the present invention, showing the final condition of the card.

As shown in FIG. 10, after the card 91 is not pushed, the first elastic member 31 (referring to FIG. 3) urges the first sliding block 22 backwards to move the card 91 backwards with the rear end touching the stop devices 15. In this time, the elevating device 18 keeps acting on the rear end of the card 91 to keep the card 91 in a higher position of the space 12 and act on the stop devices 15. An insertion process is completed.

Figure 11:
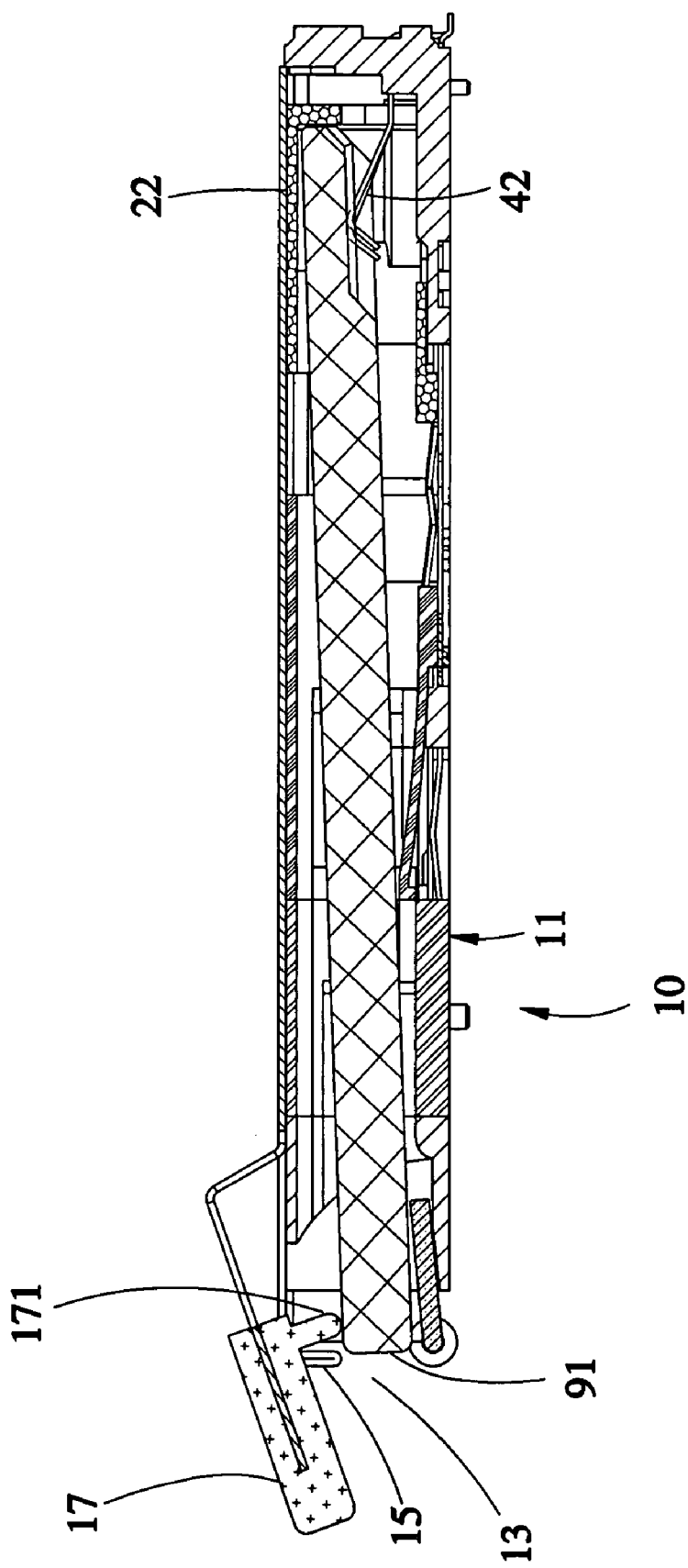
FIG. 11 is a sketch diagram of the preferred embodiment of the present invention, showing the condition of ejecting the card.

To eject the card 91, as shown in FIG. 11, user only needs to press the releasing device 17 that the pressing block 171 under the releasing device 17 will press the card 91 through the hollow portion 14 (referring to FIG. 1) to move the rear end of the card 91 downwards and depart from the stop devices 15. The first elastic member 31 (referring to FIG. 3) moves the first sliding block 22 backwards and the card 91 to expose the rear end of the card 91 out of the opening 13 for user to hold it to draw the card 91 out.

It has to be mentioned that some short cards, such as XD card, may be elevated by the terminal sets 42, 43, 44 to the higher position of the space 12 rather than the elevating device 18, so that the elevating device 18 is only designed for auxiliary elevation of long cards, in other words, the present invention may not provides the elevating device 18.

In addition, the releasing device 17 and the elastic piece 16 may be integrated into a single element that is not limited in the feature described and shown in the embodiment and drawings.

In conclusion, the functions of the present invention are:

1. Powerful shockproof: With the structure of the present invention, the inserted card may be covered by the main member, elevated by the terminal sets and the elevating device and moved backwards against the stop devices by the first elastic member acting on the sliding blocks to be totally supported in all sides so that the card has no chance escaping the card connector before user operates the card connector to eject it. Therefore, the present invention has a powerful shockproof function and a stable function when the card is inserted.

2. Easy to eject the card: To eject the card, user only needs to press the releasing device that the machine will eject the card automatically to provide an easy way of ejection of the card.

3. Dustproof: The elevating device substantially closes the opening to bar dust out of the main member.

The present invention may be mounted on automobile to fit the vibrating and dusty environment thereof.

The description above is a few preferred embodiments of the present invention and the equivalence of the present invention is still in the scope of the claim of the present invention.

What is claimed is:

1. A card connector for automobile, comprising:
a main member including a space therein, an opening at a front thereof to be an entrance of the space, a hollow portion on a top thereof communicated with the space and the opening, a stop device above the opening and at a side of the hollow portion, an elastic piece above the opening and a releasing device on the elastic piece and corresponding to the hollow portion;
at least a sliding block, which is received in the space of the main member and reciprocated along a card path, having an acting point to act on a card inserted into the main member;
a first elastic device, which is provided in the main member, urging the sliding block outwards; and
at least a terminal set provided in the main member and corresponding to the sliding block.

2. The card connector for automobile as defined in claim 1, wherein there are two of the stop devices at opposite sides of the hollow portion.

3. The card connector for automobile as defined in claim 1, wherein the releasing device is connected to the elastic piece and has a pressing block projecting downwardly to a position above the hollow.

4. The card connector for automobile as defined in claim 1, wherein the main member further includes an elevating device in the main member and under the hollow portion to be moved up and down and a second elastic member urging the elevating device upwards.

5. The card connector for automobile as defined in claim 4, wherein the elevating device is a plate with a shaft pivoted on the main member under the opening, and the second elastic member is a torsional spring to urge the elevating device swinging to close the opening and touch the stop device, a distal end of the elevating device is moved up and down relative to the main member.

6. The card connector for automobile as defined in claim 1, wherein there are a plurality of the sliding blocks and the terminal sets.

7. The card connector for automobile as defined in claim 6, wherein there are three of the sliding blocks arranged in series of a first sliding block, a second sliding block and a third sliding block from an inner side of the space to the opening, and there are three of the terminal sets arranged in series of a first terminal set, a second terminal set and a third terminal set corresponding to the first sliding block, the second sliding block and the third sliding block respectively, and the first elastic member urges the first block, and the sliding block are interacted with each other.

8. The card connector for automobile as defined in claim 7, wherein the sliding blocks correspond and act on different cards respectively.

* * * * *